US010779035B2

(12) United States Patent
So et al.

(10) Patent No.: US 10,779,035 B2
(45) Date of Patent: *Sep. 15, 2020

(54) METHOD AND APPARATUS OF TRANSMITTING MEDIA DATA RELATED INFORMATION IN MULTIMEDIA TRANSMISSION SYSTEM

(71) Applicant: Samsung Electronics Co., Ltd., Suwon-si, Gyeonggi-do (KR)

(72) Inventors: Young-Wan So, Gunpo-si (KR); Kyung-Mo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

This patent is subject to a terminal disclaimer.

(21) Appl. No.: 15/110,880

(22) PCT Filed: Jan. 9, 2015

(86) PCT No.: PCT/KR2015/000259
§ 371 (c)(1),
(2) Date: Jul. 11, 2016

(87) PCT Pub. No.: WO2015/105384
PCT Pub. Date: Jul. 16, 2015

(65) Prior Publication Data
US 2016/0381413 A1     Dec. 29, 2016

(30) Foreign Application Priority Data

Jan. 9, 2014   (KR) .................. 10-2014-0003084

(51) Int. Cl.
*H04N 21/44*     (2011.01)
*H04N 21/438*    (2011.01)
*H04N 21/647*    (2011.01)

(52) U.S. Cl.
CPC ..... *H04N 21/44004* (2013.01); *H04N 21/438* (2013.01); *H04N 21/64723* (2013.01)

(58) Field of Classification Search
CPC combination set(s) only.
See application file for complete search history.

(56) References Cited

U.S. PATENT DOCUMENTS 8,301,725 B2 * 10/2012 Biderman .......... H04N 7/17318
709/217
8,850,055 B1 *  9/2014 Mani .................... H04N 21/238
709/231

(Continued)

FOREIGN PATENT DOCUMENTS

CN      101843074 A     9/2010
JP      11-308231 A    11/1999

(Continued)

OTHER PUBLICATIONS

Study on the QoS Based on RTP/RTCP Protocol, Li Huibin, Mechanical Management and Development, vol. 23, No. 1, Feb. 28, 2008.

(Continued)

*Primary Examiner* — Greg C Bengzon
(74) *Attorney, Agent, or Firm* — Jefferson IP Law, LLP

(57) ABSTRACT

A method for transmitting media data-related information at a transmitting entity in a multimedia transmission system including at least one intermediate node is provided. The method includes generating information of traffic, which corresponds to at least one media data configuring a multimedia service, for each valid time period, and transmitting the media data-related information comprising the information of traffic to a receiving entity through the at least one intermediate node.

24 Claims, 4 Drawing Sheets

(56) References Cited

U.S. PATENT DOCUMENTS

| | | | | |
|---|---|---|---|---|
| 8,892,691 | B2* | 11/2014 | Pantos | G06F 17/30053 709/219 |
| 9,015,335 | B1* | 4/2015 | Gigliotti | G06F 17/30017 348/415.1 |
| 9,032,466 | B2* | 5/2015 | Gupta | H04N 21/26266 725/114 |
| 9,621,607 | B2* | 4/2017 | Payette | H04L 67/141 |
| 9,984,726 | B2* | 5/2018 | Toma | G11B 27/10 |
| 2004/0117839 | A1* | 6/2004 | Watson | H04L 29/06027 725/87 |
| 2006/0168323 | A1 | 7/2006 | Kim et al. | |
| 2007/0074266 | A1* | 3/2007 | Raveendran | H04N 19/36 725/135 |
| 2008/0049650 | A1* | 2/2008 | Coppage | H04W 24/08 370/310 |
| 2008/0248782 | A1* | 10/2008 | Stiers | H04N 21/41407 455/412.2 |
| 2009/0013356 | A1* | 1/2009 | Doerr | H03M 13/29 725/62 |
| 2009/0116458 | A1 | 5/2009 | Ramesh et al. | |
| 2009/0287841 | A1* | 11/2009 | Chapweske | H04L 65/4084 709/231 |
| 2011/0058554 | A1* | 3/2011 | Jain | H04L 45/00 370/392 |
| 2012/0221741 | A1* | 8/2012 | Frojdh | G11B 20/14 709/231 |
| 2012/0254456 | A1* | 10/2012 | Visharam | H04N 21/2343 709/231 |
| 2013/0094563 | A1 | 4/2013 | Bae | |
| 2013/0124679 | A1* | 5/2013 | Harrang | H04L 1/0007 709/217 |
| 2013/0223240 | A1* | 8/2013 | Hayes | H04L 65/1066 370/252 |
| 2013/0242185 | A1* | 9/2013 | Roth | H04N 21/2393 348/441 |
| 2013/0276017 | A1* | 10/2013 | Walker | H04N 21/6405 725/25 |
| 2013/0286868 | A1* | 10/2013 | Oyman | H04L 65/80 370/252 |
| 2013/0298177 | A1 | 11/2013 | Rhyu et al. | |
| 2013/0305304 | A1 | 11/2013 | Hwang et al. | |
| 2013/0315223 | A1 | 11/2013 | Ho et al. | |
| 2013/0318276 | A1 | 11/2013 | Dalal | |
| 2014/0019593 | A1* | 1/2014 | Reznik | H04L 65/60 709/219 |
| 2014/0023071 | A1* | 1/2014 | Park | H04L 29/06482 370/389 |
| 2014/0123202 | A1* | 5/2014 | Gautier | H04L 65/80 725/115 |
| 2014/0189772 | A1* | 7/2014 | Yamagishi | H04N 21/2225 725/116 |
| 2014/0280750 | A1* | 9/2014 | Panje | H04L 65/608 709/219 |
| 2014/0282766 | A1* | 9/2014 | Good | H04N 21/2343 725/93 |
| 2014/0282799 | A1* | 9/2014 | Bae | H04N 21/236 725/116 |
| 2014/0297813 | A1* | 10/2014 | Gomes | H04L 65/602 709/219 |
| 2014/0317234 | A1* | 10/2014 | Mueller | H04L 47/10 709/217 |
| 2014/0368734 | A1* | 12/2014 | Hoffert | H04N 5/4403 348/564 |
| 2014/0369222 | A1* | 12/2014 | Kim | H04L 65/4076 370/252 |
| 2015/0067184 | A1* | 3/2015 | Parthasarathy | H04L 41/5067 709/231 |
| 2015/0113577 | A1* | 4/2015 | Yie | H04N 21/2362 725/109 |
| 2015/0128162 | A1* | 5/2015 | Ionescu | G06Q 30/00 725/14 |
| 2015/0146552 | A1* | 5/2015 | Majmundar | H04L 43/0894 370/252 |
| 2015/0181003 | A1* | 6/2015 | Kim | H04L 69/22 370/474 |
| 2015/0195374 | A1* | 7/2015 | Wang | H04L 65/601 709/219 |
| 2016/0050246 | A1* | 2/2016 | Liao | H04L 65/604 709/219 |
| 2016/0078901 | A1* | 3/2016 | Toma | H04N 21/643 386/355 |
| 2018/0152498 | A1* | 5/2018 | Luby | H04L 65/604 |

FOREIGN PATENT DOCUMENTS

| | | |
|---|---|---|
| KR | 10-2006-0055172 A | 5/2006 |
| KR | 10-2010-0105569 A | 9/2010 |
| KR | 10-2013-0116391 A | 10/2013 |
| KR | 10-2013-0140113 A | 12/2013 |
| WO | 2012/099423 A2 | 7/2012 |
| WO | 2012/167197 A1 | 12/2012 |
| WO | 2013/055162 A2 | 4/2013 |

OTHER PUBLICATIONS

Application of VBR and CBR and Interconversion Thereof, Xiong Rong, et al., TV Engineering, No. 2, Jun. 30, 2018.
Chinese Office Action dated Jul. 4, 2018, issued in the Chinese Application No. 201580012764.5.
Chinese Office Action dated Mar. 7, 2019, issued in Chinese Application No. 201580012764.5.
Japanese Office Action dated Jan. 22, 2019, issued in Japanese Application No. 2016-545799.

* cited by examiner

METHOD AND APPARATUS OF TRANSMITTING MEDIA DATA RELATED INFORMATION IN MULTIMEDIA TRANSMISSION SYSTEM

PRIORITY

This application is a National Phase Entry of PCT International Application No. PCT/KR2015/000259, which was filed on Jan. 9, 2015, and claims a priority to Korean Patent Application No. 10-2014-0003084, which was filed on Jan. 9, 2014, the contents of which are incorporated herein by reference.

TECHNICAL FIELD

The present invention relates to a method and an apparatus of transmitting media data related information in a multimedia transmission system.

BACKGROUND

A Moving Picture Experts Group (MPEG) Media Transport (MMT)-based communication system, which has been proposed as one of multimedia transmission technologies for providing multimedia services, uses a separate protocol, for example, a Resource reSerVation Protocol (RSVP), in a process for allocating resources for particular traffic. The RSVP reserves relevant resources by using a predetermined representative value, for example, a peak rate, a sustainable rate, or the like.

FIG. 1 is a view for explaining an example of a case where resources are allocated by using an RSVP in a typical MMT-based communication system.

Referring to FIG. 1, for convenience of description, consideration is given to a case where multimedia services that an MMT-based communication system provides include traffics 1, 2, and 3 respectively corresponding to a total of three media data. At this time, when resources are allocated by using the RSVP, it may be considered that predetermined representative values, such as A1 to A3, are preset for the respective traffics. Here, the total sum of the representative values of the traffics is represented as A, and the representative value has the unit of [bps].

SUMMARY

1. Technical Problem

However, when traffics respectively corresponding to media data are actually transmitted, a bitrate according to time does not have a predetermined value, but changes in real time. Accordingly, when pre-fixed resources are allocated based on the RSVP, intermediate nodes, for example, a router, etc., of a network have difficulty in accurately reflecting the amount of resources or a change characteristic of media data, which is actually required for the relevant traffic, on the basis of predetermined representative values.

Meanwhile, the above-described information is presented only as background information for helping the understanding of the present invention. No determination has been made, and no assertion is made, as to whether any of the above might be applicable as the prior art related to the present invention.

2. Technical Solution

Embodiments of the present invention propose a method and an apparatus for delivering pieces of change characteristic-related information of respective traffics corresponding to media data to intermediate nodes of a network when a multimedia service is provided in an MMT-based communication system.

In accordance with an aspect of the present invention, a method for transmitting media data-related information at a transmitting entity in a multimedia transmission system including at least one, the method comprising generating information of traffic, which corresponds to at least one media data configuring a multimedia service for each valid time period, and transmitting the media data-related information comprising the information of traffic to a receiving entity through the at least one intermediate node.

In accordance with another aspect of the present invention, a method for allocating a resource at a intermediate node in a multimedia transmission system, the method comprising receiving, from a transmitting entity, information of traffic corresponding to at least one media data configuring a multimedia service, the information of traffic being generated for each valid time, forwarding, to a receiving entity, media data-related information comprising the information of tranffic, determining available resource based on the information of trafficc identified from the media data-related information, and allocating the available resource for other trafficc.

In accordance with still another aspect of the present invention, a transmitting entity for transmitting media data-related information in a multimedia transmission system, the method comprising a controller configured to generate information of traffic, which corresponds to at least one media data configuring a multimedia service for each valid time period, and a tranceiver configured to transmit information comprising the information of traffic to the receiving entity through the at least one intermediate node.

In accordance with yet another aspect of the present invention, an intermediate node for allocating a resourc in a multimedia transmission system, the method comprising a transceiver configured to receive, from a transmitting entity, information of traffic corresponding to at least one media data configuring a multimedia service, the information of traffic being generated for each valid time, and forward, to a receiving entity, media data-related information comprising the information of tranffic, and a controller configured to determine available resource based on the information of trafficce identified from the media data-related information, and allocate the available resource for other trafficce.

In an embodiment of the present invention, when a multimedia service is provided in an MMT-based communication system, pieces of change characteristic-related information of respective traffics corresponding to media data may be delivered to intermediate nodes of a network, so that the intermediate nodes can more efficiently operate resources by using the pieces of change characteristic-related information and can reduce the waste of network resources.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
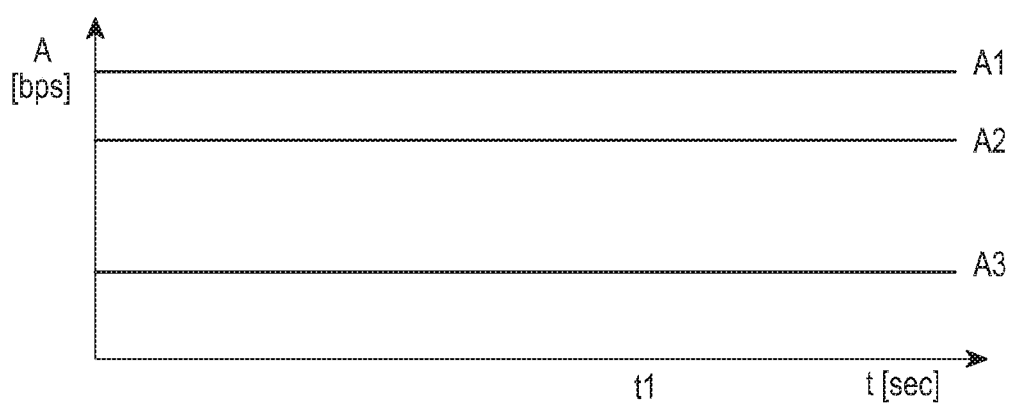
FIG. 1 is a view for explaining an example of a case where resources are allocated by using an RSVP in a typical MMT-based communication system according to an embodiment of the present disclosure.

Hereinafter, the operating principle of exemplary embodiments of the present invention will be described in detail with reference to accompanying drawings. Like reference numerals designate like components in the drawings where possible even though components are shown in different drawings. In the following description of the present invention, a detailed description of related known functions or configurations will be omitted so as not to obscure the subject of the present invention. The terms which will be described below are terms defined in consideration of the functions in the present invention, and may be different according to users, intentions of the users, or customs. Therefore, the definitions of the terms should be made based on the contents throughout the specification.

Embodiments of the present invention provide a method and an apparatus for delivering pieces of change characteristic-related information of respective traffics corresponding to media data to intermediate nodes of a network when an MMT media-based multimedia service is provided. For example, consideration is given to a case where a particular movie is provided through the multimedia service. In this case, respective media data exist which correspond to subtitles, images, and voice content which form the particular movie, and each of the media data may include one asset. As a specific example, assets may be configured which correspond one-to-one to the subtitles, the images, and the voice content which form the particular movie. Accordingly, in an embodiment of the present invention, ADC will be described as an example of pieces of change characteristic-related information of respective traffics corresponding to media data, namely, assets. Accordingly, one ADC according to an embodiment of the present invention may be configured for each asset, or may be configured to be mapped to multiple assets. Accordingly, the ADC may be defined as a description of the required amounts of Quality of Service (QoS) and statistics which are required to deliver at least one asset. ADC of at least one asset may be used in order for a transmitting entity to deliver transmission parameters and QoS parameters to be applied to resource reservation and a transmission policy. The ADC may be expressed in a protocol agnostic format typically used by a conventionally-defined QoS control service entity. The ADC may include, for example, a QoS_descriptor and a bitstream_descriptor. The QoS_descriptor is defined as QoS levels required for delay and loss for delivering the relevant asset. Also, the bitstream_descriptor provides statistics of the relevant asset desired to be delivered. Pieces of specific information that the QoS_descriptor and the bitstream_descriptor deliver will be described in detail below.

Hereinafter, embodiments of the present invention propose specific examples of delivering ADC of at least one media datum, namely, an asset, that forms a multimedia service that an MMT transmitting entity desires to provide to an MMT receiving entity.

(1) Full ADC delivery

First, as an example corresponding to one asset, an embodiment of the present invention proposes a full ADC delivery method for including ADC information (hereinafter referred to as "overall ADC information"), which describes overall traffic characteristics during a total reproduction time period with respect to a voice file of a particular movie, in a ADC signaling message and transmitting the ADC signaling message including the overall ADC information to an MMT-based receiving entity. Specifically, the ADC signaling message according to an embodiment of the present invention includes the overall ADC information. Also, in order to represent a characteristic of the flow of a relevant asset, the ADC signaling message further includes a packet_id and a flow_label in addition to the overall ADC information. Respective fields corresponding to the packet_id and the flow_label use field values previously defined by an MMT standard. Further, even one asset has a traffic characteristic different for each service type. Examples of the service type include Video On Demand (VOD), live, file, and the like. Accordingly, pieces of ADC information respectively corresponding to multiple versions or types for each asset may be configured. Accordingly, an ADC_type field, which is an identifier capable of distinguishing ADC information from another according the version or type of the relevant asset, may be included in the ADC signaling message.

The ADC signaling message according to an embodiment of the present invention may include, as an example, the packet_id field, the flow_label field, and the ADC_type field as shown in the full ADC delivery case of Table 1 below. In each of Tables 1 to 5 below, the first column indicates pieces of information corresponding to "syntax," the second column indicates pieces of information corresponding to "value," the third column indicates pieces of information corresponding to "No. of bits," and the last fourth column indicates pieces of information corresponding to "Mnemonic."

TABLE 1

| ADC_message ( ) { | | | |
| --- | --- | --- | --- |
|   message_id | | 16 | uimsbf |
|   version | | 8 | uimsbf |
|   length | | 32 | uimsbf |
|   ADC_type | | 4 | uimsbf |
|   message_payload{ | | | |
|     packet_id | | 16 | uimsbf |
|     qos_descriptor{ | | | |
|       loss_tolerance | | 8 | uimsbf |
|       jitter_sensitivity | | 8 | uimsbf |
|       class_of_service | | 1 | bslbf |
|       bidirection_indicator | | 1 | bslbf |
|     } | | | |
|     if (class_of_service == 1) | | | |
|       bitstream_descriptor_vbr{ | | | |
|         flow_label | | 7 | uimsbf |
|         sustainable_rate | | 16 | uimsbf |
|         buffer_size | | 16 | uimsbf |
|         peak_rate | | 16 | uimsbf |
|         max_MFU_size | | 8 | uimsbf |
|         mfu_period | | 8 | uimsbf |
|     }else | | | |
|       bitstream_descriptor_cbr{ | | | |
|         flow_label | | 7 | uimsbf |
|         peak_rate | | 16 | uimsbf |

TABLE 1-continued

|  |  |  | |
|---|---|---|---|
|  | max_MFU_size | 8 | uimsbf |
|  | mfu_period | 8 | uimsbf |
| } |  |  |  |
| } |  |  |  |
| } |  |  |  |

For reference, the ADC signaling message shown in Table 1 further includes a message_id indicating that the relevant message is a message including the ADC information, a version indicating a version of the ADC information included in the ADC signaling message, and the like. Also, the ADC signaling message further includes the above-described qos_descriptor and the above-described bitstream_ descriptor. The qos_descriptor includes a loss_tolerance indicating loss tolerance required when an asset corresponding to the ADC information is delivered, a jitter_sensitivity representing a jitter level required by a network through the asset is delivered between end-to-end points, for example, the transmitting entity and the receiving entity, through which the ADC information is delivered, a class_of_service which manages each type of a bitstream according to a particular scheme and classifies services according to different classes, and a bidirection_indicator indicating whether bidirectional delivery is required. The bidirection_indicator of 1 bit, for example, may be set to 1 when bidirectional delivery is required, and may be set to 0 when the bidirectional delivery is not required.

The bitstream_descriptor may be configured for each service class. Table 1 shows respective bitstream_descriptors of a Constant Bit Rate (CBR) service class and a Variable Bit Rate (VBR) service class. The CBR service class may ensure a peak bit rate during an optional time period exclusively used to transmit an asset, and may be used for real-time services which require a fixed bit rate, such as Voice over Internet Protocol (VoIP) without silence suppression. The VBR service class ensures a bit rate which enables a peak bit rate of an asset having delay constraints to be allowed and maintained through a shared channel. The VBR service class may be used for most real-time services, such as video telephony, a video conference, a streaming service, and the like. A bitstream_descriptor_vbr representing a bitstream descriptor of the VBR service class and a bitstream_descriptor_cbr representing a bitstream descriptor of the CBR service class include at least one of the following parameters. The parameters include a flow_label indicating a flow identifier, a sustainable_rate which is a minimum bit rate which needs to be ensured for continuous delivery of a relevant asset, a buffer_size which is a maximum buffer size for delivery of the relevant asset, a peak_rate representing a peak bit rate during the continuous delivery of the relevant asset, a max_MFU_size representing a maximum size of a Media Fragment Unit (MFU), and an mfu_period representing a cycle of MFUs during the continuous delivery of the relevant asset. Here, the MFU is defined as a divided unit of a Media Processing Unit (MPU) that configures an asset.

(2) Partial ADC Delivery with Time Duration

Another embodiment of the present invention proposes a method for partial ADC delivery with time duration of extracting partial ADC information corresponding to a partial time duration in overall ADC information of a relevant asset, including the extracted partial ADC information in an ADC signaling message, and transmitting the ADC signaling message including the extracted partial ADC information to an MMT-based receiving entity. Specifically, the ADC signaling message according to another embodiment of the present invention includes partial ADC information and valid time period information of the partial ADC information. The valid time period information, for example, may be included in the ADC signaling message, in the form of a "Valid Period" field as shown in the case of partial ADC delivery with time duration of Table 2 below.

TABLE 2

| | | | |
|---|---|---|---|
| ADC_message ( ) { | | | |
|    message_id | | 16 | uimsbf |
|    version | | 8 | uimsbf |
|    length | | 32 | uimsbf |
|    ADC_type | | 4 | uimsbf |
|    Valid_Period | | 32 | uimsbf |
|    message_payload{ | | | |
|       packet_id | | 16 | uimsbf |
|       qos_descriptor{ | | | |
|          loss_tolerance | | 8 | uimsbf |
|          jitter_sensitivity | | 8 | uimsbf |
|          class_of_service | | 1 | bslbf |
|          bidirection_indicator | | 1 | bslbf |
|       } | | | |
|       if (class_of_service == 1) | | | |
|          bitstream_descriptor_vbr{ | | | |
|             flow_label | | 7 | uimsbf |
|             sustainable_rate | | 16 | uimsbf |
|             buffer_size | | 16 | uimsbf |
|             peak_rate | | 16 | uimsbf |
|             max_MFU_size | | 8 | uimsbf |
|             mfu_period | | 8 | uimsbf |
|          }else | | | |
|          bitstream_descriptor_cbr{ | | | |
|             flow_label | | 7 | uimsbf |
|             peak_rate | | 16 | uimsbf |
|             max_MFU_size | | 8 | uimsbf |
|             mfu_period | | 8 | uimsbf |
|          } | | | |
|    } | | | |
| } | | | |

Referring to Table 2, the ADC signaling message according to another embodiment of the present invention includes partial ADC information, and accordingly, includes "Valid_Period" on the partial ADC information. In addition, the ADC signaling message according to another embodiment of the present invention further includes "packet_id," "flow_label," and "ADC_type" which are included in the ADC signaling message according to an embodiment of the present invention. When a transmitting entity transmits the ADC signaling message including the "Valid_Period" field and then, a valid time period expires which is set in the "Valid_Period" field, the transmitting entity may periodically transmit ADC including the "Valid_Period" field in which a new time period is set. Although not shown in Table 2, information included in the "Valid_Period" field may be subdivided into, for example, respective values corresponding to a start time point and a time duration of the valid time period of the ADC information included in the relevant ADC signaling message.

(3) Partial ADC Delivery with Version Information

Still another embodiment of the present invention proposes a method for partial ADC delivery with version information of extracting partial ADC information from overall ADC information on a relevant asset, including the extracted partial ADC information in an ADC signaling message, and transmitting the ADC signaling message including the extracted partial ADC information to an MMT-based receiving entity. The ADC signaling message according to still another embodiment of the present invention includes version information indicating whether it is necessary to update the partial ADC, instead of the valid time period information of the partial ADC information included in the above-described ADC signaling message according to another embodiment of the present invention.

The version information, for example, may be included in the ADC signaling message, in the form of "version" information as shown in the case of partial ADC delivery with version of Table 3 below.

TABLE 3

```
ADC_message ( ) {
    message_id                      16  uimsbf
    version                          8  uimsbf
    length                          32  uimsbf
    ADC_type                         4  uimsbf
    Version                          8  uimsbf
    message_payload{
        packet_id                   16  uimsbf
        qos_descriptor{
            loss_tolerance           8  uimsbf
            jitter_sensitivity       8  uimsbf
            class_of_service         1  bslbf
            bidirection_indicator    1  bslbf
        }
        if (class_of_service == 1)
            bitstream_descriptor_vbr{
                flow_label           7  uimsbf
                sustainable_rate    16  uimsbf
                buffer_size         16  uimsbf
                peak_rate           16  uimsbf
                max_MFU_size         8  uimsbf
                mfu_period           8  uimsbf
            }else
            bitstream_descriptor_cbr{
                flow_label           7  uimsbf
                peak_rate           16  uimsbf
                max_MFU_size         8  uimsbf
                mfu_period           8  uimsbf
            }
    }
}
```

Referring to Table 3, the ADC signaling message according to still another embodiment of the present invention includes partial ADC information and "version" of a relevant asset, and in addition, further includes "packet_id," "flow_label," and "ADC_type" which are included in the ADC signaling message according to an embodiment of the present invention.

Meanwhile, in the above-described embodiment and other embodiments of the present invention, the ADC signaling message including the relevant ADC information is delivered to the receiving entity regardless of whether the receiving entity has made a request.

(4) ADC Delivery Based on Request

As compared with the above, in yet another embodiment of the present invention, consideration is given to a case where at least one router, which is an example of intermediate nodes configured between a transmitting entity and a receiving entity, desires to know partial information on change characteristics (i.e., ADC) of subsequent media data of an MMT flow which is flowing through the router itself. Then, the relevant intermediate node may send a request for ADC information of the relevant MMT flow to the transmitting entity. Accordingly, yet another embodiment of the present invention proposes a method for ADC delivery based on request of receiving a response to the request by the intermediate node. Specifically, the transmitting entity configures and notifies of ADC signaling message including address information to which the intermediate node is to transmit the ADC request. Here, the notification may use a scheme in which the transmitting entity broadcasts the address information to the intermediate nodes and the receiving entity. Examples of the address information may include an Internet Protocol (IP)/Port and a Uniform Resource Locator (URL), and the like. As an example, the ADC message according to yet another embodiment of the present invention may include a request_address field corresponding to the address information as shown in the case of ADC delivery based on request of Table 4 below.

TABLE 4

```
ADC_message ( ) {
    message_id                      16  uimsbf
    version                          8  uimsbf
    length                          32  uimsbf
    ADC_type                         4  uimsbf
    Request_address
    message_payload{
        packet_id                   16  uimsbf
        qos_descriptor{
            loss_tolerance           8  uimsbf
            jitter_sensitivity       8  uimsbf
            class_of_service         1  bslbf
            bidirection_indicator    1  bslbf
        }
        if (class_of_service == 1)
            bitstream_descriptor_vbr{
                flow_label           7  uimsbf
                sustainable_rate    16  uimsbf
                buffer_size         16  uimsbf
                peak_rate           16  uimsbf
                max_MFU_size         8  uimsbf
                mfu_period           8  uimsbf
            }else
            bitstream_descriptor_cbr{
                flow_label           7  uimsbf
                peak_rate           16  uimsbf
                max_MFU_size         8  uimsbf
                mfu_period           8  uimsbf
            }
    }
}
```

Referring to Table 4, the ADC signaling message according to yet another embodiment of the present invention includes "packet_id," "flow_label," and "ADC_type" which are included in the ADC signaling message according to an embodiment of the present invention, and further includes "request_address."

Thereafter, the intermediate nodes according to yet another embodiment of the present invention may configure an ADC request message including a packet_id, a flow_label, and an ADC_type, and the like of the ADC information desired to be requested. Here, it is considered that the intermediate nodes are in a state of acquiring the request_address field acquired from ADC signaling information received from the transmitting entity. Accordingly, the intermediate nodes according to yet another embodiment of the present invention all transmit the configured ADC request message to an address corresponding to the request_address field. The ADC request message, for example, may be represented as shown in Table 5 below.

TABLE 5

```
ADC_Request_message ( ) {
    message_id                      16  uimsbf
    version                          8  uimsbf
    length                          32  uimsbf
    packet_id                       16  uimsbf
    flow_label                       7  uimsbf
    ADC_type                         4  uimsbf
    start_time                      32  uimsbf
    end_time                        32  uimsbf
}
```

Referring to FIG. 5, the ADC request message according to still yet another embodiment of the present invention may include "packet_id," "flow_label," and "ADC_type" which are included in the ADC signaling message according to an embodiment of the present invention, and may further include time duration information designated for the relevant ADC information requested by the intermediate node. Here, the time duration information may include, as an example, a start_time field an end_time field respectively corresponding to a start time point and an end time point of the ADC information. Therefore, according to still yet another embodiment of the present invention, an intermediate node may acquire the relevant ADC information from a transmitting entity during each time duration, and thus may acquire more accurate ADC information than when overall ADC information corresponding to a time period of a relevant asset is acquired according to an embodiment of the present invention.

Figure 2:
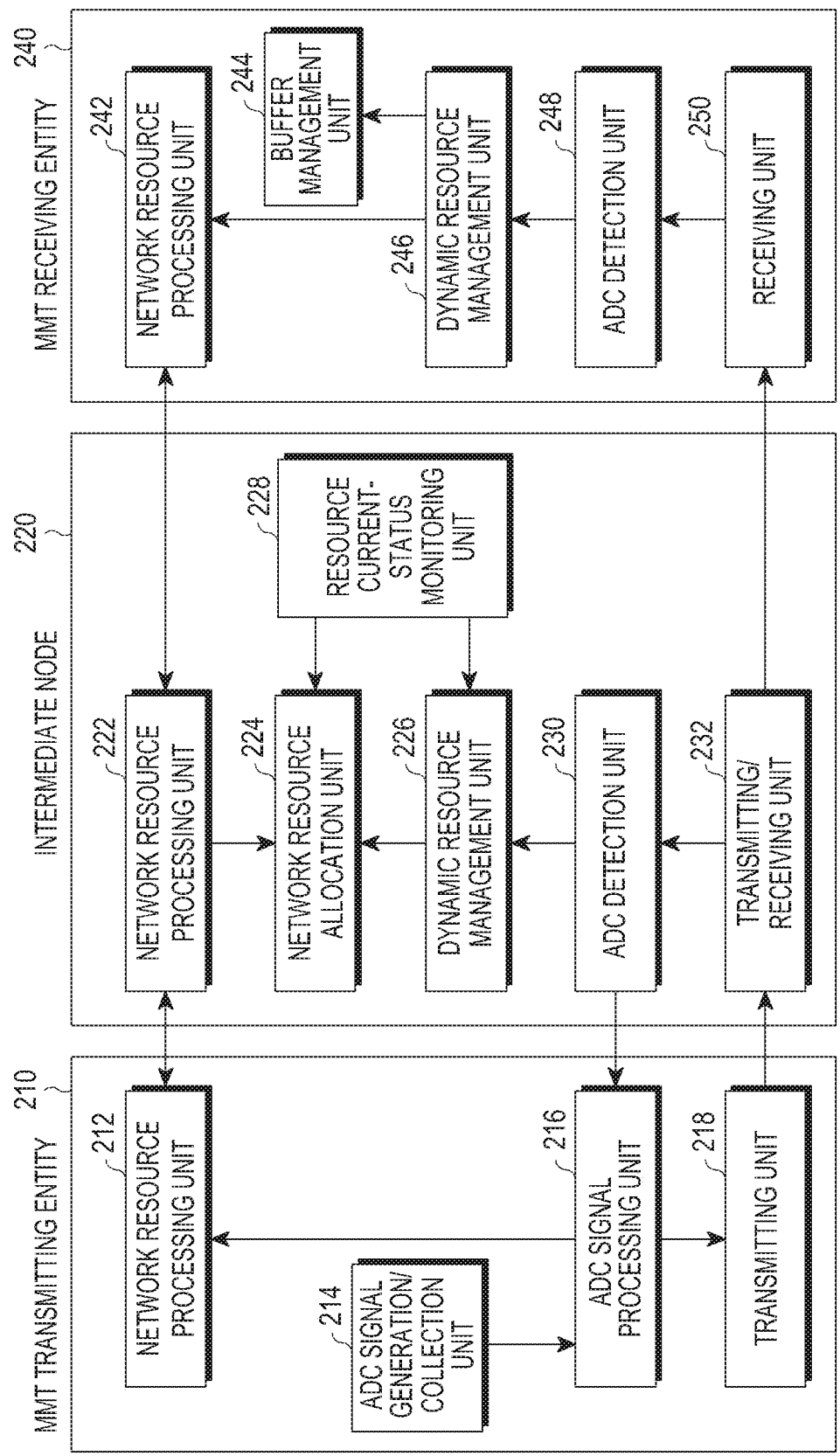
FIG. 2 is a view illustrating an example of an MMT-based communication system according to an embodiment of the present disclosure.

FIG. 2 is a view illustrating an example of an MMT-based communication system according to an embodiment of the present invention.

Referring to FIG. 2, the MMT-based communication system 200 that provides a multimedia service includes, as an example, an MMT transmitting entity 210, an MMT receiving entity 240, and an intermediate node 220. The MMT transmitting entity 210 is a transmitting node that delivers assets (i.e., media data) respectively corresponding to pieces of content, which are provided by the multimedia service, to the MMT receiving entity 240 through the intermediate node 220. Also, the MMT receiving entity 240 is a receiving node that receives the media data, which have been transmitted by the MMT transmitting entity 210, through the intermediate node 220. The intermediate node 220 serves to deliver media data between the MMT transmitting entity 210 and the MMT receiving entity 240, and to reserve network resources when the network resources are required to deliver the media data.

First, the MMT transmitting entity 210 includes, as an example, a network resource processing unit 212, an ADC signal generation/collection unit 214, an ADC signal processing unit 216, and a transmitting unit 218. The ADC signal processing unit 216 collects pieces of ADC information including traffics (i.e., pieces of change characteristic-related information of assets) respectively corresponding to media data according to time, and performs processing for transmitting the collected pieces of ADC information to the MMT receiving entity 240. Also, when an ADC request (e.g., an ADC request message) for particular ADC information is received from the intermediate node 220, the MMT transmitting entity 210 delivers information, which corresponds to the ADC request, to the intermediate node 220. The ADC signal generation/collection unit 214 collects pieces of ADC information. At this time, ADC information may be collected for each asset, or pieces of ADC information may be collected for multiple assets.

The network resource processing unit 212 may reserve network resources for transmitting media data by using a separate protocol (e.g., an RSVP) which is not defined by the MMT. The transmitting unit 218 configures ADC information and the like on assets, and each asset or multiple assets, in the form of an MMT packet, and transmits, to the MMT receiving entity 240, the ADC information and the like in the form of the MMT packet.

The intermediate node 220 includes, as an example, a network resource processing unit 222, a network resource allocation unit 224, a dynamic resource management unit 226, a resource current-status monitoring unit 228, an ADC detection unit 230, and a transmitting/receiving unit 232. The ADC detection unit 230 monitors MMT packets delivered to the MMT receiving entity 240 through the intermediate node 220, and extracts an ADC signaling message including the ADC information from the monitored MMT packets. For example, the MMT packet includes a packet header and a payload. In this regard, the ADC detection unit 230 may determine whether the relevant message includes ADC information, on the basis of a type field, message_id information, and the like within the packet header. Also, the ADC detection unit 230 may detect whether it is necessary to update ADC information, and when the need arises, may receive the updated ADC, or may send a request for ADC information, which is desired to be acquired, to the MMT transmitting entity 210. The dynamic resource management unit 226 may understand a current status of the use of network resources of the intermediate node 220 itself (e.g., a router), may analyze change characteristics of the media data transmitted to the MMT receiving entity 240 through the intermediate node 220 itself, and may allocate available network resources to other traffics.

Figure 3:
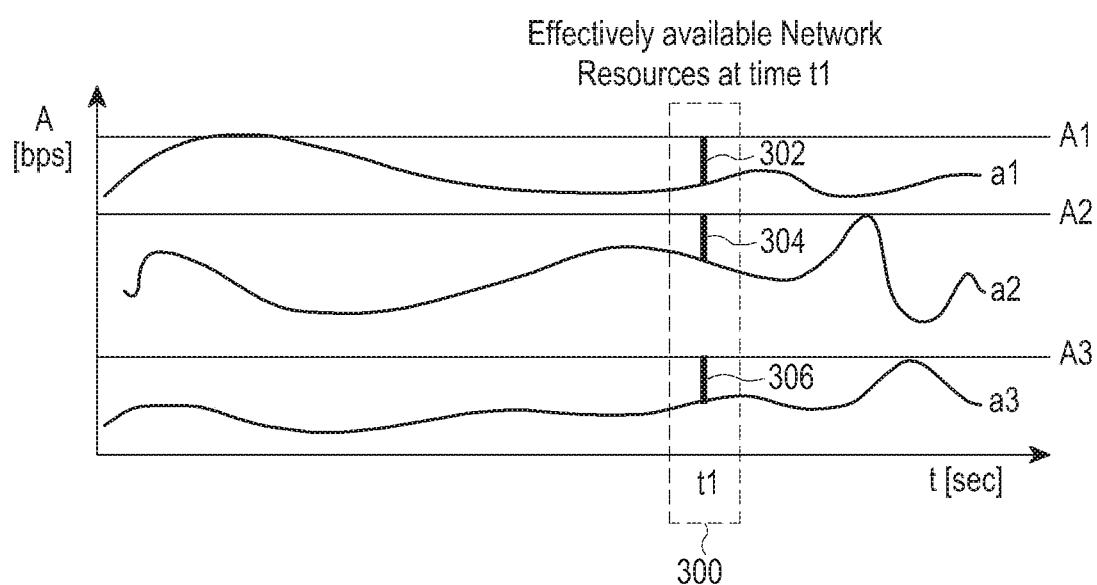
FIG. 3 is a view for explaining an example of an operation of an intermediate node for allocating resources based on Asset Delivery Characteristics (ADC) information acquired from a transmitting entity according to an embodiment of the present disclosure.

FIG. 3 is a view for explaining an example of an operation of an intermediate node for allocating resources based on Asset Delivery Characteristics (ADC) information acquired from a transmitting entity according to an embodiment of the present invention.

Referring to FIG. 3, it is considered that A [bps] represents the total amount of network resources capable of being currently provided by an intermediate node and An [bps] represents, as an example, the amount of network resources reserved for media datan by a resource reservation request which is based on an RSVP. Also, an [bps] represents the amount of actually-required resources depending on a time point of the received media datan on the basis of ADC information acquired by the intermediate node. Here, the media data are considered in a total of three cases, and thus, n is represented by 1, 2, and 3.

When an available network resource amount at a time point t1 300 is defined as Avail(t), the intermediate node may calculate Avail(t) as follows by using an Equation below. The value of Avail(t) may be calculated by a dynamic resource management unit 326 illustrated in FIG. 3.

$$\text{Avail}(t) = \{A1(t) - a1(t)\} + \{A2(t) - a2(t)\} + \ldots + \{An(t) - an(t)\} (\text{here}, A = A1 + A2 + A3 + \ldots + An) \quad \text{Equation}$$

As expressed in the above Equation, the available network resource amount is acquired by subtracting an actually-required resource amount from a resource amount of resources allocated based on the RSVP with respect to traffic corresponding to each of the media data. An available resource amount 302 of media traffic 1 is acquired by subtracting a1 from A1 at the time point t1, and an available resource amount 304 of media traffic 2 is acquired by subtracting a2 from A2 at the time point t1. Also, an available resource amount 306 of media traffic 3 is acquired by subtracting a3 from A3 at the time point t1. Then, the dynamic resource management unit 226 may calculate a total available network resource amount by adding together the available network resource amounts of the respective media data. Accordingly, the dynamic resource management unit 226 according to an embodiment of the present invention may allocate the calculated Avail(t) to a network resource request for the third traffic other than media traffics 1 and 2.

In the intermediate node according to an embodiment of the present invention, the network resource reservation processing unit 222 may reserve network resources in order to transmit MMT media data by using a separate protocol (e.g., the RSVP) which is not defined by the MMT.

The transmitting/receiving unit 232 transmits an MMT packet, which has been received from the MMT transmitting entity 210, to the MMT receiving entity 240. Then, the network resource allocation unit 224 allocates network resources of the intermediate node 220 to particular traffic. Then, the resource current-status monitoring unit 228 monitors a current status of the use of the network resources of the intermediate node 220. Specifically, the resource current-status monitoring unit 228 confirms, in real time, actually-required resource amounts (which correspond to a1, a2, and a3 in FIG. 3) according to the respective traffics corresponding to the relevant media data, and delivers the confirmed actually-required resource amounts to the dynamic resource management unit 226.

Lastly, the MMT receiving entity 240 includes a network resource reservation processing unit 242, a buffer management unit 244, a dynamic resource management unit 246, an ADC detection unit 248, and an receiving unit 250. The dynamic resource management unit 246 receives ADC information transmitted by the MMT transmitting entity 210, and acquires change characteristics of the respective traffics corresponding to the relevant media data on the basis of the ADC information. Then, in view of the change characteristics, the dynamic resource management unit 346 applies the change characteristics to the efficient update of a network resource request. When the dynamic resource management unit 246 performs an RSVP-based network resource reservation between the MMT receiving entity 240 and the MMT transmitting entity 210, the dynamic resource management unit 246 may use "Valid_Period" information, "version" information, and the like which have been acquired from the ADC information. Also, the dynamic resource management unit 246 may utilize the ADC information for a buffer amount and the like which need to be secured by a buffer of the MMT receiving entity 240. The ADC detection unit 248 monitors the received MMT packets, and extracts ADC information of an ADC signaling message within the monitored MMT packets. For example, the ADC detection unit 248 may determine whether the relevant message includes ADC information, on the basis of a type field of a packet header forming the MMT packet, "message_id" information included in the ADC signaling message, and the like. Also, the network resource processing unit 242 processes a network resource reservation for transmitting MMT media data on the basis of a separate protocol (e.g., the RSVP) which is not defined by the MMT. The receiving unit 250 receives and processes an MMT packet delivered by the MMT transmitting entity 210.

Figure 4:
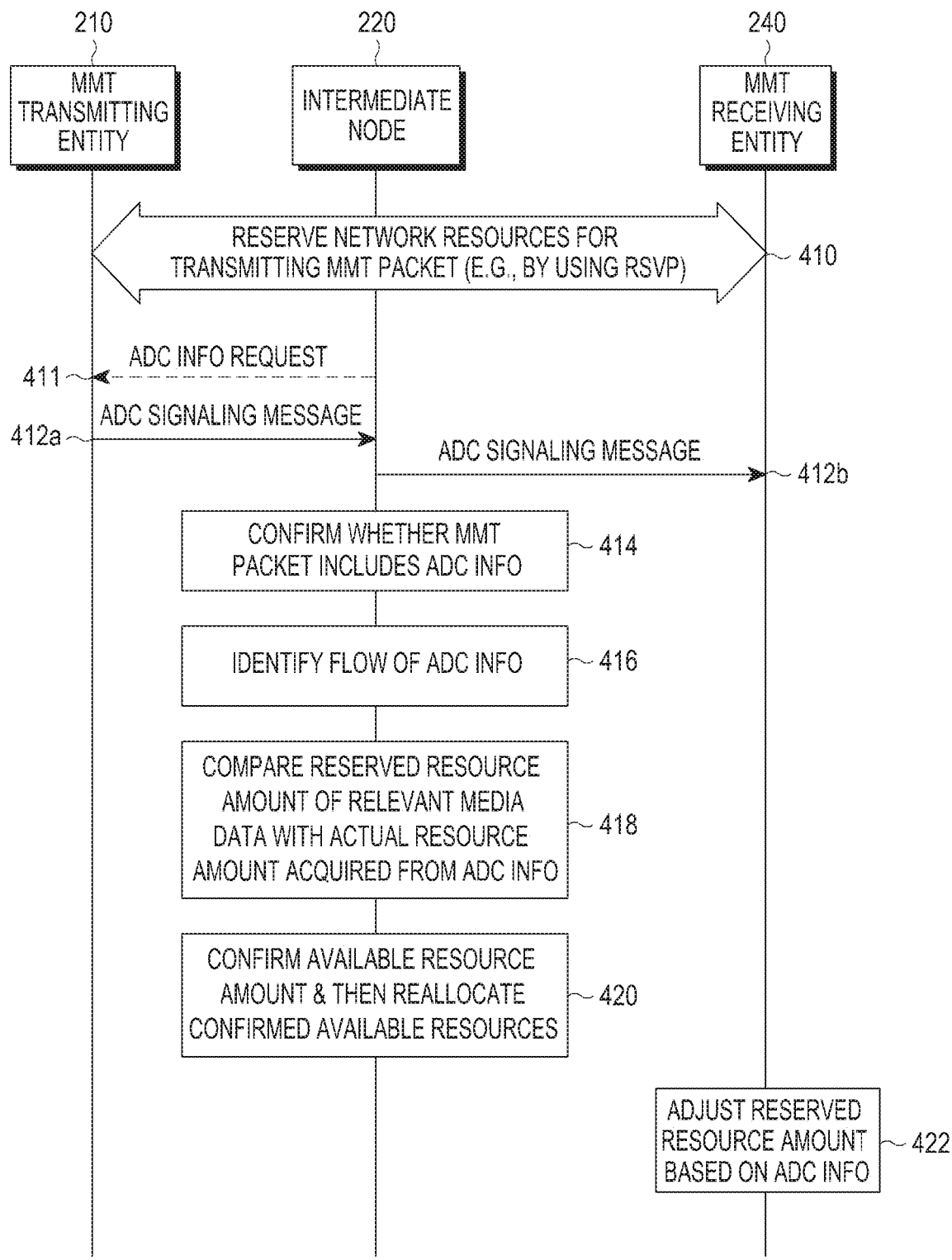
FIG. 4 is a flow diagram illustrating an example of an overall operation of delivering ADC information to an intermediate node and a receiving entity according to an embodiment of the present disclosure.

FIG. 4 is a flow diagram illustrating an example of an overall operation of delivering ADC information to an intermediate node and a receiving entity according to an embodiment of the present invention. For convenience of description, consideration will be given to and a description will be made of a case where an MMT-based communication system is configured as illustrated in FIG. 2.

Referring to FIG. 4, in step 410, the MMT transmitting entity 210 and the MMT receiving entity 240 reserve network resources (e.g., bandwidths, paths, etc. according to respective traffics corresponding to relevant media data) for transmitting an MMT packet by using an existing protocol (e.g., the RSVP).

Then, in steps 412a and 412b, the MMT transmitting entity 210 according to an embodiment of the present invention transmits an MMT packet including ADC information on each of the relevant media data to the MMT receiving entity 240 through the intermediate node 220. Here, a method for transmitting ADC information is performed in different forms according to the above-described respective embodiments of the present invention. Specifically, in the full ADC delivery-based embodiment of the present invention, overall ADC information for each asset may be included in an ADC signaling message, and the ADC signaling message including the overall ADC information for each asset may be transmitted. At this time, the overall ADC information may be configured in association with the multiple assets, and may include respective pieces of ADC information of the multiple assets. Specifically, an ADC signaling message, according to the full ADC delivery-based embodiment of the present invention, includes overall ADC information on a movie file, as an example corresponding to one asset. Next, in an embodiment of the present invention which is based on partial ADC delivery with time duration, instead of the transmission of overall ADC information on a relevant asset, partial ADC information is extracted and an ADC signaling message is configured by using the extracted partial ADC information. At this time, the ADC signaling message includes valid time period information of the partial ADC information together with the extracted partial ADC information. Then, when the valid time period of the relevant partial ADC information expires, the MMT transmitting entity 210 may periodically transmit ADC including the valid time period information which is set to a new time period. An ADC signaling message, according to an embodiment of the present invention which is based on partial ADC delivery with version information, includes partial ADC information together with version information indicating whether it is necessary to update the partial ADC information. Lastly, an ADC signaling message, according to an ADC request-based embodiment of the present invention, includes ADC information configured based on an ADC information request that the intermediate node 220 has transmitted to the MMT transmitting entity 210, as in step 411 of FIG. 4. In this case, it is considered that the MMT transmitting entity 210 is in a state of previously notifying the intermediate node 220 and the MMT receiving entity 240 of address information to which the ADC information request is to be transmitted.

In steps 414 to 420, the intermediate node 220, that has received the ADC signaling message transmitted according to the above-described respective embodiments of the present invention, may confirm an available resource amount for each relevant asset and may reallocate the confirmed available resources. Specifically, in step 414, the intermediate node 220 may open and see flows which transmit MMT packets that the MMT transmitting entity 210 has transmitted to the MMT receiving entity 240, and may confirm whether an MMT packet includes ADC information, based on a type field within a packet header and "message_id" information within the ADC signaling message, with respect to the relevant MMT packet including the ADC information among the flows which have been opened and seen. Then, when it is confirmed that the message_id indicates that the ADC signaling message includes the ADC information, in step 416, the intermediate node 220 may acquire the ADC information included in the ADC signaling message, and may identify a flow which the ADC information is traffic information about, through "packet_id" and "flow_label" included in the ADC signaling message. Then, in step 418, the intermediate node 220 may confirm a required QoS level and a change characteristic of traffic depending on time (i.e., an actually-required resource amount of the relevant asset) on the identified flow. Accordingly, the intermediate node 220 may compare the confirmed actually-required resource amount with the resource amount reserved in step 410. Then, in step 420, the intermediate node 220 may confirm an available resource amount according to a gap between the actually-required resource amount and the reserved resource amount, and may then reallocate the confirmed available resources for the third traffic.

When acquiring the overall ADC information of the relevant asset from the ADC signaling message transmitted by the MMT transmitting entity 210, the intermediate node 220 according to an embodiment of the present invention continuously confirms an availble resource amount at a particular time point during an overall time period allocated to the asset, as in the case of the time point t1 illustrated in FIG. 3. Also, the intermediate node 220 may utilize the confirmed available resources, which are not actually used, for the third traffic. As another example, when the intermediate node 220 acquires partial ADC information and valid time period information of the relevant asset from the ADC signaling message transmitted by the MMT transmitting entity 210, the intermediate node 220 may confirm an available resource amount by using the partial ADC information during a time duration corresponding to the valid time period information, and may utilize the confirmed available resources for the third traffic. As still another example, when the intermediate node 220 acquires partial ADC information of the relevant asset and version information of the partial ADC information from the ADC signaling message transmitted by the MMT transmitting entity 210, the intermediate node 220 compares the version of the current ADC information with the version information of the partial ADC information. When a result of the comparison shows that the partial ADC information has a new version, the intermediate node 220 may confirm an available resource amount by using the partial ADC information, and may utilize the confirmed available resources for the third traffic. Lastly, the intermediate node 220 transmits the ADC information request on the basis of address information for an ADC information request, which has previously been acquired from the MMT transmitting entity, to the MMT transmitting entity 310. Here, the ADC information request may include information for identifying a packet and a flow which request ADC information; and information indicating a time duration, a version, the type, and the like of the requested ADC information. Then, the intermediate node 220 may acquire ADC information corresponding to the ADC information request from the MMT transmitting entity 310, may confirm available resources on the basis of the acquired ADC information, and may utilize the confirmed resources for the third traffic. Meanwhile, in step 422, the MMT receiving entity 240, that has received the ADC signaling message transmitted by the MMT transmitting entity 210 in step 412b, may compare an amount of a network sources reserved in step 410 with an actually-required network resource amount for each asset being received on the basis of ADC information included in the ADC signaling message, may confirm the actually-required network resource amount, and accordingly, may predict a subsequent traffic characteristic of the relevant asset. As an example, when the MMT receiving entity 240 again reserves network resources by using the RSVP, the MMT receiving entity 240 may perform an operation, such as an operation of reserving a resource amount, which is close to an actually-required resource amount, and the like, in view of an available resource amount for the relevant asset. Also, the MMT receiving entity 240 may determine whether the network resources reserved for the relevant asset are to be updated, on the basis of a gap between an available resource amount and an actually-required resource amount for the relevant asset. Further, it is possible to previously secure a buffer amount required by a buffer of the MMT receiving entity 210.

As described above, since the intermediate node can receive pieces of ADC information of respective traffics corresponding to media data of a multimedia service provided by the MMT transmitting entity, the intermediate node can confirm an actually available resource amount for each traffic by using the ADC information on the relevant traffic, and can efficiently operate the confirmed available resource amount, so that the waste of resources can be prevented.

Meanwhile, although the exemplary embodiments of the present invention have been described, it goes without saying that various changes and modifications may be made to the exemplary embodiments of the present invention without departing from the spirit and scope of the present invention. Therefore, the spirit and scope of the present invention is not limited to the described embodiments thereof, but is defined by the appended claims and equivalents.

The invention claimed is:

1. A method for transmitting a packet by a transmitting entity in a multimedia system, the method comprising:
   generating at least one packet, wherein a packet of the at least one packet comprises a header and a payload including an asset delivery characteristics (ADC) message for an asset corresponding to media data; and
   transmitting the at least one packet,
   wherein the ADC message comprises message identifier (ID) information for an identification of the ADC message, version information of the ADC message, and information related to ADC,
   wherein the information related to the ADC comprises a quality of service (QoS) descriptor providing information for QoS requirements for delivery of the asset, a bitstream descriptor providing information for statistics of the asset for delivery of the asset, and a valid start time and valid duration related to the ADC message,
   wherein the information related to the ADC is included in a message payload of the ADC message, and
   wherein the QoS descriptor comprises a jitter sensitivity indicating a jitter level required for the delivery of the asset between the transmitting entity and a receiving entity, a class of service to manage each type of a bitstream based on a particular scheme, and a bidirectional indicator indicating whether a bidirectional delivery is required for the delivery of the asset.

2. The method of claim 1,
   wherein the information for the QoS requirements are corresponding to QoS levels on delay and loss for the delivery of the asset, and
   wherein the QoS descriptor further comprises a loss tolerance required for the delivery of the asset.

3. The method of claim 1,
   wherein the bitstream descriptor are classified by service classes comprising a constant bit rate (CBR) and a variable bit rate (VBR),
   wherein a bitstream descriptor for the VBR comprises a sustainable rate indicating a minimum bitrate to be guaranteed for continuous asset delivery, a maximum buffer size for the delivery of the asset, a peak rate indicating a highest bitrate during the continuous asset delivery, a maximum size of a media fragment unit (MFU) divided from at least one media processing unit (MPU) constituting the asset, and a period indicating a transmitting time interval of the MFU during continuous asset delivery, and wherein a bitstream descriptor for the CBR comprises the peak rate, the maximum size of MFU, and the period.

4. The method of claim 1, further comprising:
updating the information related to the ADC; and
periodically transmitting the updated information.

5. The method of claim 1, wherein the information related to the ADC further comprises an ID of the packet.

6. A method for receiving a packet at a receiving entity in a multimedia system, the method comprising:
receiving at least one packet, wherein a packet of the at least one packet comprises a header and a payload including an asset delivery characteristics (ADC) message; and
identifying the ADC message included in the payload of the packet,
wherein the ADC message comprises message identifier (ID) information for an identification of the ADC message, version information of the ADC message, and information related to ADC,
wherein the information related to the ADC comprises a quality of service (QoS) descriptor providing information for QoS requirements for delivery of an asset, a bitstream descriptor providing information for statistics of the asset for delivery of the asset, and a valid start time and valid duration related to the ADC message,
wherein the information related to the ADC is included in a message payload of the ADC message, and
wherein the QoS descriptor comprises a jitter sensitivity indicating a jitter level required for the delivery of the asset between a transmitting entity and a receiving entity, a class of service to manage each type of a bitstream based on a particular scheme, and a bidirectional indicator indicating whether a bidirectional delivery is required for the delivery of the asset.

7. The method of claim 6,
wherein the information for the QoS requirements are corresponding to QoS levels on a delay and a loss for the delivery of the asset, and
wherein the QoS descriptor further comprises a loss tolerance required for the delivery of the asset.

8. The method of claim 6,
wherein the bitstream descriptor are classified by service classes comprising a constant bit rate (CBR) and a variable bit rate (VBR),
wherein a bitstream descriptor for the VBR comprises a sustainable rate indicating a minimum bitrate to be guaranteed for continuous asset delivery, a maximum buffer size for the delivery of the asset, a peak rate indicating a highest bitrate during the continuous asset delivery, a maximum size of a media fragment unit (MFU) divided from at least one media processing unit (MPU) constituting the asset, and a period indicating a transmitting time interval of the MFU during continuous asset delivery, and
wherein a bitstream descriptor for the CBR comprises the peak rate, the maximum size of MFU, and the period.

9. The method of claim 6, further comprising:
receiving periodically updated information related to the ADC.

10. The method of claim 6, wherein the information related to the ADC further comprises an ID of the packet.

11. A transmitting entity for transmitting a packet in a multimedia system, the transmitting entity comprising:
a processor configured to generate at least one packet, wherein a packet of the at least one packet comprises a header and a payload including an asset delivery characteristics (ADC) message for an asset corresponding to media data; and
a transceiver configured to transmit the at least one packet,
wherein the ADC message comprises message identifier (ID) information for an identification of the ADC message and information related to ADC,
wherein the information related to the ADC comprises a quality of service (QoS) descriptor providing information for QoS requirements for delivery of the asset, a bitstream descriptor providing information for statistics of the asset for delivery of the asset, and a valid start time and valid duration related to the ADC message,
wherein the information related to the ADC is included in a message payload of the ADC message, and
wherein the QoS descriptor comprises a jitter sensitivity indicating a jitter level required for the delivery of the asset between the transmitting entity and a receiving entity, a class of service to manage each type of a bitstream based on a particular scheme, and a bidirectional indicator indicating whether a bidirectional delivery is required for the delivery of the asset.

12. The transmitting entity of claim 11,
wherein the information for the QoS requirements are corresponding to QoS levels on delay and loss for the delivery of the asset, and
wherein the QoS descriptor further comprises a loss tolerance required for the delivery of the asset.

13. The transmitting entity of claim 11,
wherein the bitstream descriptor are classified by service classes comprising a constant bit rate (CBR) and a variable bit rate (VBR),
wherein a bitstream descriptor for the VBR comprises a sustainable rate indicating a minimum bitrate to be guaranteed for continuous asset delivery, a maximum buffer size for the delivery of the asset, a peak rate indicating a highest bitrate during the continuous asset delivery, a maximum size of a media fragment unit (MFU) divided from at least one media processing unit (MPU) constituting the asset, and a period indicating a transmitting time interval of the MFU during continuous asset delivery, and
wherein a bitstream descriptor for the CBR comprises the peak rate, the maximum size of MFU, and the period.

14. The transmitting entity of claim 11, wherein the processor is further configured to update the information related to the ADC, and control the transceiver to periodically transmit the updated information.

15. The transmitting entity of claim 11, wherein the information related to the ADC further comprises an ID of the packet.

16. A receiving entity for receiving a packet in a multimedia system, the receiving entity comprising:
a transceiver configured to receive at least one packet, wherein a packet of the at least one packet comprises a header and a payload including an asset delivery characteristics (ADC) message; and
a processor configured to identify the ADC message included in the payload of the packet,
wherein the ADC message comprises message identifier (ID) information for an identification of the ADC message and information related to ADC, wherein the information related to the ADC comprises a quality of service (QoS) descriptor providing information for QoS requirements for delivery of an asset, a bitstream descriptor providing information for statistics of the asset for delivery of the asset, and a valid start time and valid duration related to the ADC message, wherein the information related to the ADC is included in a message payload of the ADC message, and wherein the QoS descriptor comprises a jitter sensitivity indicating a jitter level required for the delivery of the asset between a transmitting entity and the receiving entity, a class of service to manage each type of a bitstream based on a particular scheme, and a bidirectional indicator indicating whether a bidirectional delivery is required for the delivery of the asset.

17. The receiving entity of claim 16,
wherein the information for the QoS requirements are corresponding to QoS levels on delay and loss for the delivery of the asset, and
wherein the QoS descriptor further comprises a loss tolerance required for the delivery of the asset.

18. The receiving entity of claim 16,
wherein the bitstream descriptor are classified by service classes comprising a constant bit rate (CBR) and a variable bit rate (VBR),
wherein a bitstream descriptor for the VBR comprises a sustainable rate indicating a minimum bitrate to be guaranteed for continuous asset delivery, a maximum buffer size for the delivery of the asset, a peak rate indicating a highest bitrate during the continuous asset delivery, a maximum size of a media fragment unit (MFU) divided from at least one media processing unit (MPU) constituting the asset, and a period indicating a transmitting time interval of the MFU during continuous asset delivery, and
wherein a bitstream descriptor for the CBR comprises the peak rate, the maximum size of MFU, and the period.

19. The receiving entity of claim 16, wherein the transceiver is further configured to receive periodically updated information related to the ADC.

20. The receiving entity of claim 16, wherein the information related to the ADC further comprises an ID of the packet.

21. The method of claim 1,
wherein the information related to the ADC is acquired by an intermediate node based on an ADC information request of the intermediate node, and the information related to the ADC is used by the intermediate node to identify an amount of available resources in network resources reserved for the delivery of the asset, and
wherein the information related to the ADC is used by the receiving entity to identify a required network resource amount and to predict a traffic characteristic of the asset based on the required network resource amount.

22. The method of claim 6,
wherein the information related to the ADC is acquired by an intermediate node based on an ADC information request of the intermediate node, and the information related to the ADC is used by the intermediate node to identify an amount of available resources in network resources reserved for the delivery of the asset, and
wherein the information related to the ADC is used by the receiving entity to identify a required network resource amount and to predict a traffic characteristic of the asset based on the required network resource amount.

23. The transmitting entity of claim 11,
wherein the information related to the ADC is acquired by an intermediate node based on an ADC information request of the intermediate node, and the information related to the ADC is used by the intermediate node to identify an amount of available resources in network resources reserved for the delivery of the asset, and
wherein the information related to the ADC is used by the receiving entity to identify a required network resource amount and to predict a traffic characteristic of the asset based on the required network resource amount.

24. The receiving entity of claim 16,
wherein the information related to the ADC is acquired by an intermediate node based on an ADC information request of the intermediate node, and the information related to the ADC is used by the intermediate node to identify an amount of available resources in network resources reserved for the delivery of the asset, and
wherein the information related to the ADC is used by the receiving entity to identify a required network resource amount and to predict a traffic characteristic of the asset based on the required network resource amount.

* * * * *